United States Patent Office 3,664,854
Patented May 23, 1972

3,664,854
QUICK SETTING AND QUICK HARDENING CEMENT AND METHOD FOR PRODUCING THE SAME
Hiroshi Kokuta, Chigasaki, Japan, assignor of a fractional part interest to Ajinomoto Co., Inc., Tokyo, Japan
Filed Feb. 16, 1970, Ser. No. 11,518
Claims priority, application Japan, Feb. 17, 1969, 44/11,008
Int. Cl. C04b 7/32
U.S. Cl. 106—90
7 Claims

ABSTRACT OF THE DISCLOSURE

A quick setting and quick hardening cement and a method for producing the cement is disclosed. The cement contains aluminous cement, lime or lime containing material, portland cement, and a ketocarboxylic acid or its salt as a chelating agent. The chelating agent froms a complex selectively with Ca ion in the alkaline state and after a certain period, the complex will decompose or decrease. Therefore, the time to begin setting can be controlled to 1–90 minutes and sufficient hardening takes place in a short time.

---

The present invention relates to a quick setting and quick hardening cement and the method of manufacturing the same.

Further, the present invention relates to a method for manufacturing a quick setting and quick hardening cement consisting of hydraulic aluminous cement of $CaO\text{-}Al_2O_3$ system; lime such as quick lime, slaked lime, calcined dolomite and dolomite plaster; chelating agent; and portland cement.

The characteristic feature of the cement of the present invention is that the setting and hardening time of the cement which show a substantial strength in practical use, is short. That is, the setting and hardening times of several ordinary cements are from 6 hours to 1 week, while the setting time of the cement of the invention can be less than 1 hour, or less than a half an hour, as the case may be, in order to be utilized in continuous production processes, similar to the production processes of synthetic plastic articles. Further, the long term strength of the cement of the invention is as good as that of portland cement.

In the prior art, it has not been possible to obtain a cement with a sufficient compressive strength together with a quick setting property by admixing several additives into the ordinary cements. In other words, cement, which can be used for continuous production processes as that of the present invention, has not been obtained.

Another characteristic feature of the present invention is the use of chelating agents. In the prior art, only flash setting cement, which cannot be applied for practical uses, has been obtained by adding lime or lime containing materials into aluminous cement. The cement of the present invention employs a chelating agent which forms a complex with Ca ion selectively in an alkaline state, i.e. the chelating agent masks Ca ion for a certain period. And after that period, the masking activity of said chelating agent decreases, thus the hydration reaction in the cement admixture can be controlled and the setting and hardening time can also be regulated within 1 minute to 90 minutes in accordance with the requirements of the use, and further, sufficient working strength of the products can be obtained.

The term "setting and hardening time" hereinafter used means the time required until the cement product is hardened and can be removed from molds or dies. The term "working strength" means the strength of cement product required for it to be taken out of the dies, which, in general, is 50 kg./cm.$^2$ to 100 kg./cm.$^2$ in compressive strength.

The object of the present invention is to provide a method for producing a quick setting and quick hardening cement having a relatively short setting and hardening time.

The chelating agents being added into the admixture of aluminous cement and limes of the invention, should have the property of masking Ca ion for a certain period and after that period lose the masking property. As chelating agents having said property, ketocarboxylic acids such as 2-ketogluconic acid, α-ketoglutaric acid, pyruvic acid, oxalacetic acid, and their salts, are preefrably used.

"Industrial Chemistry Series," vol. 7, Nakahara and Murakami, "Cement, Gypsum and Lime" (published by Nikkan Kogyo Shimbunsha, Japan), discloses "It is known that quick setting property can be obtained by addition with slaked lime or portland cement into aluminous cement. It is the result of rapid increase of dissolved $Al_2O_3$ by the added $Ca(OH)_2$ or formed $Ca(OH)_2$ by hydration of portland cement, and by rapid formation of hydrates such as $C_2AH_8$ and $C_3AH_6$. (C=CaO, A=$Al_2O_3$, and H=$H_2O$.)"

In other words, it is well known that quick setting occurs when aluminous cement is admixed with lime or some materials containing lime. For example, a flash setting cement is obtained by admixing aluminous cement with lime (quick lime, slaked lime, calcined dolomite, dolomite plaster, etc.), however, it cannot be employed for practical uses. Further, if aluminous cement is mixed with portland cement clinker as a lime containing material, a flash setting cement without utility will be obtained. If aluminous cement is mixed with portland cement, the product shows false setting compared with the case that is added to other lime containing material and the hardening time is long. Accordingly, quick hardening cement cannot be obtained.

For example, the setting time of a cement which is produced by admixing 100 parts by weight of aluminous cement, 30 parts by weight of dolomite plaster and 30 parts by weight of portland cement, is somewhat longer than the flash setting cement which is produced by admixing aluminous cement, dolomite plaster and portland cement clinker. The setting time of the former is from 30 seconds to 1 minute, however, the compressive strength after 30 minutes is no more than 60 kg./cm.$^2$. However, if the above-mentioned chelating agent, for example, calcium 2-ketogluconate in the amount of only 1%, is added to the mixture of aluminous cement, lime and portland cement to mask Ca ion, the time to start setting becomes 12 minutes and compressive strength after 30 minutes becomes 110 kg./cm.$^2$. If 1% of α-ketoglutaric acid is added, the time to start setting becomes 60 minutes and the compressive strength after 2 hours becomes 190 kg./cm.$^2$.

Further, if portland cement is mixed with the chelating agent of the present invention in a slight amount, the chelating agent acts as a dispersing agent, and if the amount of chelating agent addition is a large excess, the short term strength of the cement, such as the strength after 1 week, is very inferior. Accordingly the quick setting and quick hardening cement of the present invention cannot be obtained.

These and other features of the invention will become more apparent from the following description taken in connection with the accompanying drawings in which.

Figure 1:
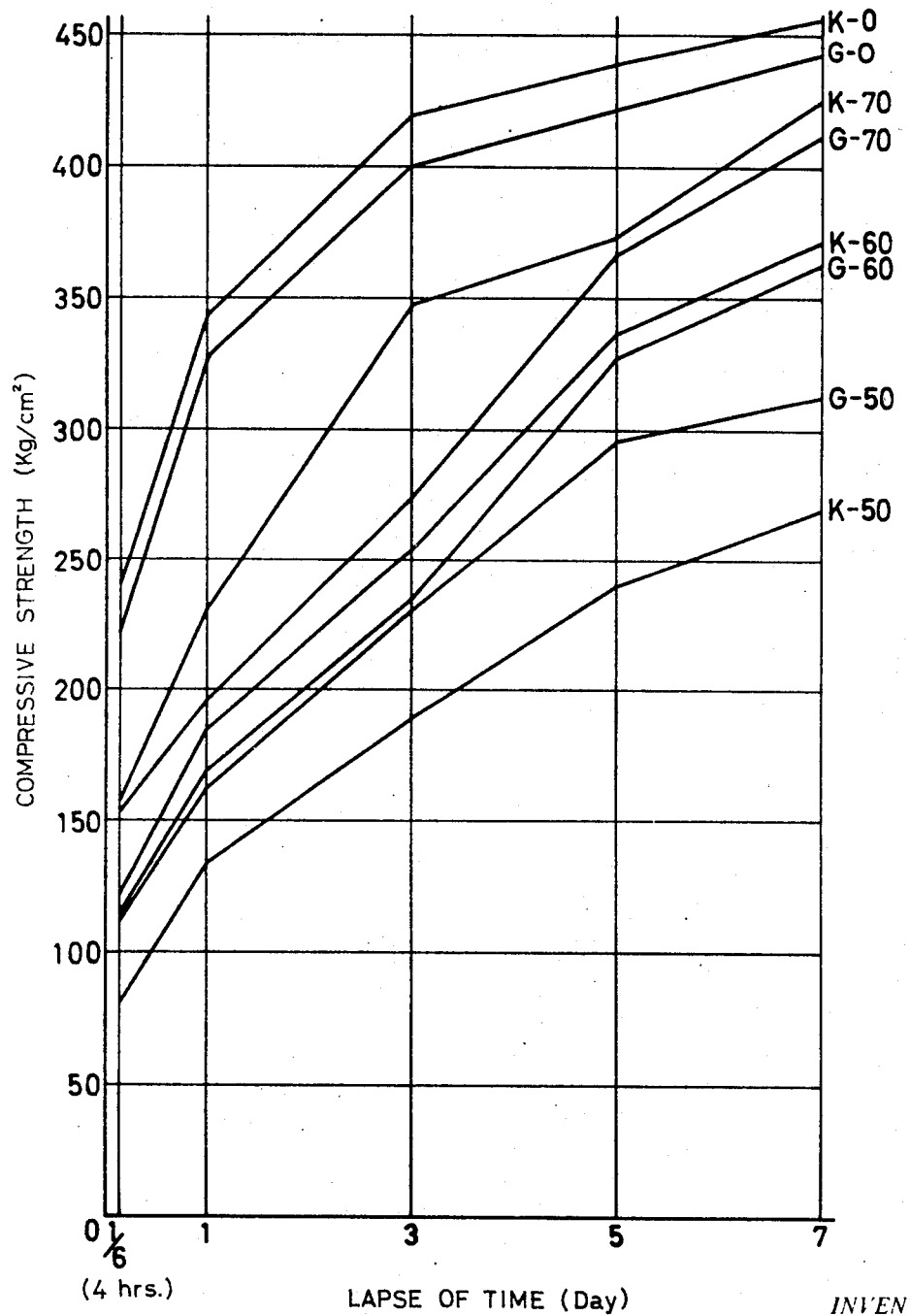
FIG. 1 is a diagram showing compressive strengthes with the lapse of time of several cement mixtures.

In FIG. 1, the notations indicate the cement mixtures as follows:

| Notations | | K-0 | K-70 | K-60 | K-50 |
|---|---|---|---|---|---|
| Aluminous cement, 80 | Mixture | 100 | 70 | 60 | 50 |
| Dolomite plaster, 20 | | | | | |
| Portland cement | | 0 | 30 | 40 | 50 |
| Calcium 2-ketogluconate | | 1.2 | 1 | 0.9 | 0.7 |

| | | G-0 | G-70 | G-60 | G-50 |
|---|---|---|---|---|---|
| Aluminous cement, 80 | Mixture | 100 | 70 | 60 | 50 |
| Dolomite plaster, 20 | | | | | |
| Portland cement | | 0 | 30 | 40 | 50 |
| α-Ketoglutaric acid | | 1.2 | 1 | 0.9 | 0.7 |

W/C of the aboves are all 35%, i.e. 35 parts by weight of water is used to each 100 parts by weight of the above cement mixtures. The time to start setting is about 5 minutes when calcium 2-ketogluconate is used, and that when α-ketoglutaric acid is used, is 60 minutes.

Figure 2:
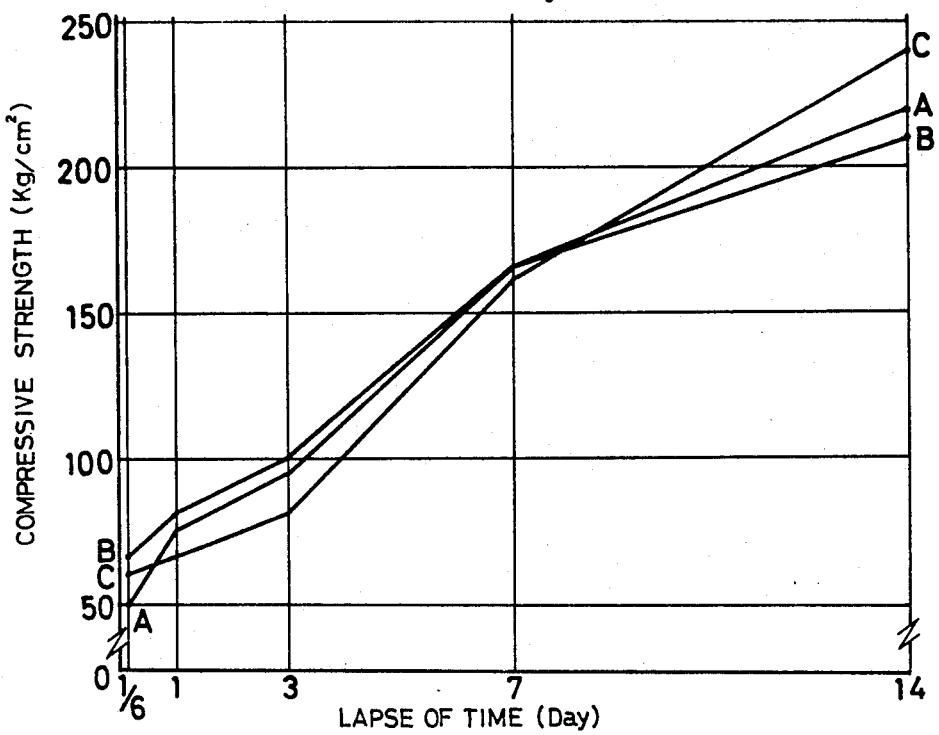
FIG. 2 is a diagram showing compressive strengthes with the lapse of time of several cement mortars.

In FIG. 2, the notations indicate the following mortars:

| Notations | | A | B | C |
|---|---|---|---|---|
| Aluminous cement, 32 | Mixture | 100 | 100 | 100 |
| Dolomite plaster, 8 | | | | |
| Portland cement, 60 | | | | |
| Calcium 2-ketogluconate | | 0.6 | | |
| α-Ketoglutaric acid | | | 0.6 | |
| Oxalacetic acid | | | | 0.4 |

The above cement mixtures are admixed with standard sand in the weight ratio of 1:1, and added water wherein W/C is 50%.

Figure 3:
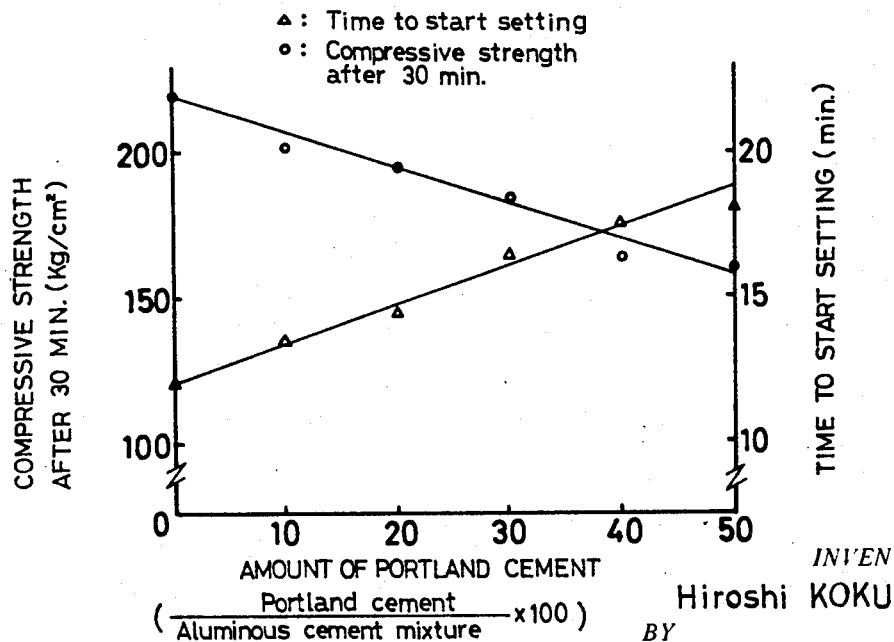
FIG. 3 is a diagram showing compressive strengthes and times to start setting of the cements of the invention with regard to the ratios of portland cement.

In FIG. 3, data are taken from the samples as follows: A mixture consisting of 100 parts by weight of aluminous cement, 30 parts by weight of dolomite plaster, and 1 part by weight of calcium 2-ketogluconate, is made. To each 100 parts by weight of the above mixture, is added 10 to 50 parts by weight of portland cement. Then, with regard to each samples, the time to start setting and the compressive strength are measured.

As will be understood from the drawings, if the quick setting and quick hardening cement consisting of aluminous cement, lime and the above-mentioned chelating agent is admixed with portland cement having a sulfuric group, the compressive strength thereof is decreased to some extent and setting time is somewhat prolonged, however, a quick setting and quick hardening cement which shows practical working strength in a short time can be obtained. The portland cement serves as a filler in these cases.

Further, as aforementioned, a mixture of aluminous cement, lime such as dolomite plaster and portland cement is not workable because it is nearly flash setting, especially in summer. If aluminus cement is mixed with only portland cement without the above-mentioned chelating agents, a cement having a property of false setting is produced and it takes a long time to be hardened.

Thus, the characteristic feature of the present invention is to provide a method for producing a quick setting and quick hardening cement by adding a special chelating agent to form a complex selectively with Ca ion and to control the hydration reaction, which has not been attained in the prior art in this technical field.

In the present invention, a cement with superior workability can be obtained by admixing portland cement with a mixture consisting of aluminus cement, lime and chelating agent in the amount of several percent by weight to several hundred percent by weight of said portland cement, without the increase of viscosity which occurs when portland cement is added with a setting promotor such as calcium chloride. In other words, the cement of the invention has low viscosity until just before the setting with good workability, and the admixing ratio to portland cement can be freely selected without any undesirable results. The cement of the present invention has no defects such as encountered in the prior art, i.e. the limitation of the amount of setting promotor to be added and the decrease of strength.

In the case where the chelating agent of the present invention is added to portland cement in an amount of less than 1%, the chelating agent acts as a dispersing agent, and the strength after 3 days and 7 days is inferior, and added in the amount of more than 1%, the setting time is delayed further and the strength does not develop. Therefore the use of more than 1% of the chelating agent is undesirable. In the use of the chelating agent, if the strength after 4 weeks is desirable as compared with the case employing ordinary dispersing agent, that is different from the feature of the invention which shows the working strength after 30 minutes to 1 hour. And in the case that aluminus cement and limes are added into portland cement which contains the chelating agent of the present invention as a dispersing agent, it will come within the scope of the present invention.

When aluminus cement is admixed with lime or lime containing materials, the quick setting and quick hardening cement of the invention cannot be obtained if the chelating agent which forms a complex salt with calcium ion selectively for a certain period and after that period decreases its activity, is not used.

The chelating agent used in the present invention should be the one which masks strongly calcium ion in an alkaline state for a certain period, and it should lose the masking activity completely after a certain period, because if the masking action is not decreased, sufficient strength of the cement mixture cannot be expected. In addition, the chelating agent should have no undesirable effect to setting and hardening of the cement.

Furthermore, since it is necessary to mask the Ca ion of hydration reaction of cement, the chelating agent should have the property to mask the Ca ion strongly and selectively in the cement.

In general, the masking actions of carboxylic acids and their salts against alkali metal ions in alkaline solutions are different with each other, and with regard to the several chelating agents of the present invention, the effects differ with the alkalinity. As for the chelating agents which meet the above-mentioned objects in the alkaline mixture consisting of aluminus cement and lime or lime containing materials, ketocarboxylic acids and their salts are most suitable. It is desirable to control setting time and resultant strength by adding alkalinity controlling agents such as sulfates, fluorosilicates, sodium silicate, borax etc. to promote the effect of the chelate compounds.

Masking activities of ketocarboxilic acid salts against Ca ion and other metal ions will be explained in the following.

When the pH is within the range from 11 to 14, the stability of the chelate compound of sodium citrate with Mg ion is greater than that of with Ca ion, and sodium gluconate tends to form a chelate compound with Fe ion than with Ca ion. However sodium 2-ketogluconate masks Ca ion more strongly than Fe ion rather and Mg ion. Accordingly, for the chelating agent to form a stable complex compound with Ca ion for a certain period in order to control the hydration reaction between aluminous cement and lime or lime containing materials, it is necessary that the chelating agent should mask Ca ion selectively and not mask other metal ions, especially the other alkaline earth metals.

Carboxylic acids form chelate compounds by co-ordinate bonding of the carboxylic groups with cations. Accordingly, it is believed that if a keto group exists adjacent to carboxylic group, it is effective to increase the chelating performance. In the meantime, these compounds having keto groups in their molecules are unstable in alkaline solution, and are easily decomposed producing $CO_2$ and $H_2O$, resulting in loss of chelating activity.

In the practice the present invention, solid or powder of components and additives may be admixed when and thereafter be pulverized, or some of them may be admixed in solution.

The above-mentioned chelating agent of the present invention forms a stable complex compound selectively with only Ca ion in alkaline solutions of pH 10 to 14.

If portland cement is mixed with calcium 2-ketogluconate, the dispersing thereof is better, setting is and short term strength is inferior. However, crystallization is promoted, and accordingly, the strength after a long period is better. This effect can be attained with not only calcium 2-ketogluconate but also, for example, with sodium gluconate, sodium citrate, etc.

If aluminous cement is mixed only with one of 2-ketogluconic acid, α-ketoglutaric acid, pyruvic acid or oxalacetic acid or their salts, the setting and hardening of the cement is delayed without any development of strength. That is, the above ketocarboxylic acid and their salts do not show their activities and effects, because aluminous cement is almost neutral.

As mentioned above, if portland cement or aluminous cement is mixed with only said ketocarboxylic acid or their salts, setting thereof do not occur in 30 minutes or 1 hour and the hardening is delayed. Therefore, in order to obtain the cement of the present invention which shows working strength in 30 minutes to 1 hour, lime or lime containing materials is admixed with into aluminous cement, and a chelating agent of ketocarboxylic acid or their salts is added. Said chelating agent of ketocarboxylic acids or their salts should have the property of forming complexes with only Ca ion selectively for a certain period, and after that period, the chelating activity of the agent is to be decreased or be lost.

In order to examine the chelating effect of the chelating agent, there is proposed a method to measure pH effects by using a pH meter. The results of such experiment are as follows:

(a) pH effect

Portland cement 30 gms. and slaked lime 15 gms. are added into 100 ml. of water, the pH of the solution being 13.5. Then 1 gm. of a chelating agent is added into the solution. The value of pH goes down quickly and after some minutes, the pH value rises back to the initial pH value. The time required to return to the original pH value is measured, the results thereof are shown in the following table. Citric acid is used by previously dissolving it in water.

| Cheating agents | Calcium 2-keto-gluconate | α-keto-glutaric acid | Citric acid |
|---|---|---|---|
| pH just after the addition of chelating agents | 13.35 | 13.25 | 13.3 |
| Times required to turn back pH=13.5 | 4'20" | 65' | 10'40" |

(b) Time to start setting and compressive strength

The following admixtures are used in the experiment:

```
                                               Gms.
Aluminous cement _____ 560
Slaked lime _____ 140
Portland cement _____ 300
Chelating agent _____  10
Water, 350 mls.
```

The times to start seating, and compressive strengths are measured, the results of which are shown in the following table:

| Chelating agents | Calcium 2-keto-gluconate | α-keto-glutaric acid | Citric acid |
|---|---|---|---|
| Times to start setting | 4'50" | 68' | 11'20" |
| Compressive strengths after 2 hours (kg./cm.²) | 250 | 180 | 90 |
| Compressive strengths after 1 day (kg./cm.²) | 375 | 250 | 112 |

From the above data, the following will be understood.

(1) A quick hardening cement can be obtained by using a chelating agent which decreases its chelating activity after a certain period.

(2) A cement with good compressive strength can be obtained by using a chelating agent which decomposes after a certain period.

(3) The result of the time in pH effect tests almost coincides with the time to start setting. In other words, it occurs in that time that the chelating agent forms a complex with Ca ion in an alkaline state and then the chleating action is decreased or the complex is decomposed.

In practice, a cement of the invention which shows 15 to 30 minutes in setting and hardening time under a low temperature such as at 5° C. can be obtained by adding 10 wt. percent or more of an admixture consisting of aluminous cement, lime containing material and a small amount of the above-mentioned ketocarboxylic acid or its salt into Portland cement. The compressive strength thereof can be controlled by the mixing ratio of the above cement components.

It should be emphasized that the present specific embodiments described herein are intended as merely illustrative and in no way restrictive of the invention.

What is claimed is:

1. A quick setting and quick hardening cement consisting essentially of a mixture of aluminous cement of $$CaO \cdot Al_2O_3$$

system, lime or lime containing material and as a chelating agent which forms a complex selectively with Ca ion at a pH of 10–14, a ketocarboxylic acid or its salt wherein said chelating agent is about 0.4 to about 1.2 parts by weight per 100 parts of the cement mixture.

2. The quick setting and quick hardening cement of claim 1 wherein said chelating agent is at least one compound selected from the group consisting of 2-ketogluconic acid, alpha-ketoglutaric acid, pyruvic acid, oxalacetic acid and their salts; and wherein the cement additionally contains Portland cement.

3. The quick setting and quick hardening cement of claim 1 wherein said lime or lime containing material is at least one material selected from the group consisting of quick lime, slaked lime, calcined dolomite, and dolomite plaster.

4. The quick setting and quick hardening cement of claim 1, additionally containing an alkalinity controlling additive to promote the effect of said chelating agent, wherein said alkalinity controlling additive is selected from the group consisting of sodium hydroxide, silicate, borax, gypsum, sulfate and fluorosilicate.

5. A method for producing the quick setting and quick hardening cement of claim 1 which comprises adding a chelating agent which forms a complex selectively with Ca ion at a pH of 10–14 to a mixture of aluminous cement of $CaO \cdot Al_2O_3$ system and lime or lime containing material wherein said chelating agent is a ketocarboxylic acid or its salt.

6. The method of claim 5 wherein said chelating agent is at least one compound selected from the group consisting of 2-ketogluconic acid, alpha-ketoglutaric acid, pyruvic acid, oxalacetic acid and their salts.

7. The method of claim 6 wherein said lime or lime containing material is at least one material selected from the group consisting of quick lime, slaked lime, calcined dolomite and dolomite plaster, and wherein an alkalinity controlling additive is additionally added to the mixture, said alkalinity controlling additive being selected from the group consisting of sodium hydroxide, silicate, borax, gypsum, sulfate and fluorosilicate.

References Cited

UNITED STATES PATENTS

| | | | |
|---|---|---|---|
| 3,433,657 | 3/1969 | Pickering | 106—104 |
| 3,413,344 | 11/1968 | Quigley et al. | 106—90 |
| 3,351,478 | 11/1967 | Dodson et al. | 106—90 |
| 3,188,221 | 6/1965 | Matsuda et al. | 106—90 |
| 3,053,674 | 9/1962 | Liberthson et al. | 106—90 |
| 2,819,171 | 1/1958 | Scripture et al. | 106—90 |
| 2,499,445 | 3/1950 | Ammann | 106—90 |

JAMES E. POER, Primary Examiner

W. T. SCOTT, Assistant Examiner

U.S. Cl. X.R.

106—95, 104, 314, 315